United States Patent
Kornacker et al.

(10) Patent No.: US 9,342,557 B2
(45) Date of Patent: May 17, 2016

(54) LOW LATENCY QUERY ENGINE FOR APACHE HADOOP

(71) Applicant: Cloudera, Inc., Palo Alto, CA (US)

(72) Inventors: Marcel Kornacker, Oakland, CA (US); Justin Erickson, San Francisco, CA (US); Nong Li, San Francisco, CA (US); Lenni Kuff, San Francisco, CA (US); Henry Noel Robinson, San Francisco, CA (US); Alan Choi, Palo Alto, CA (US); Alex Behm, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 0 days.

(21) Appl. No.: 13/800,280

(22) Filed: Mar. 13, 2013

(65) Prior Publication Data

US 2014/0280032 A1 Sep. 18, 2014

(51) Int. Cl.
*G06F 17/30* (2006.01)

(52) U.S. Cl.
CPC .... *G06F 17/30442* (2013.01); *G06F 17/30545* (2013.01)

(58) Field of Classification Search
CPC ............ G06F 17/30463; G06F 17/30433; G06F 17/30474
USPC .......................................................... 707/718
See application file for complete search history.

(56) References Cited

U.S. PATENT DOCUMENTS

| | | | |
|---|---|---|---|
| 5,325,522 A | 6/1994 | Vaughn | |
| 5,634,053 A | 5/1997 | Noble et al. | |
| 5,825,877 A | 10/1998 | Dan et al. | |
| 6,463,433 B1 | 10/2002 | Baclawski et al. | |
| 6,542,930 B1 | 4/2003 | Auvenshine | |
| 6,553,476 B1 | 4/2003 | Ayaki et al. | |
| 6,651,242 B1 | 11/2003 | Hebbagodi et al. | |
| 6,678,828 B1 | 1/2004 | Zhang et al. | |
| 6,931,530 B2 | 8/2005 | Pham et al. | |
| 7,031,981 B1 | 4/2006 | DeLuca et al. | |
| 7,055,097 B1 | 5/2006 | Netsch | |
| 7,069,497 B1 | 6/2006 | Desai | |
| 7,107,323 B2 | 9/2006 | Hara et al. | |
| 7,143,288 B2 | 11/2006 | Pham et al. | |

(Continued)

OTHER PUBLICATIONS

Babaoglu, O., and K. Marzullo, "Consistent global states of distributed systems: Fundamental concepts and mechanisms," *Distributed Systems*, 53 pages, Jan. 1993.

(Continued)

*Primary Examiner* — Scott A Waldron
*Assistant Examiner* — Dongming Wang
(74) *Attorney, Agent, or Firm* — Perkins Coie LLP

(57) ABSTRACT

A low latency query engine for APACHE HADOOP™ that provides real-time or near real-time, ad hoc query capability, while completing batch-processing of MapReduce. In one embodiment, the low latency query engine comprises a daemon that is installed on data nodes in a HADOOP™ cluster for handling query requests and all internal requests related to query execution. In a further embodiment, the low latency query engine comprises a daemon for providing name service and metadata distribution. The low latency query engine receives a query request via client, turns the request into collections of plan fragments and coordinates parallel and optimized execution of the plan fragments on remote daemons to generate results at a much faster speed than existing batch-oriented processing frameworks.

39 Claims, 14 Drawing Sheets

(56) References Cited

U.S. PATENT DOCUMENTS

| | | |
|---|---|---|
| 7,325,041 B2 | 1/2008 | Hara et al. |
| 7,392,421 B1 | 6/2008 | Bloomstein et al. |
| 7,487,228 B1 | 2/2009 | Preslan et al. |
| 7,496,829 B2 | 2/2009 | Rubin et al. |
| 7,577,900 B2 | 8/2009 | Passero et al. |
| 7,620,698 B2 | 11/2009 | Hara et al. |
| 7,631,034 B1 | 12/2009 | Haustein et al. |
| 7,640,512 B1 | 12/2009 | Appling |
| 7,653,668 B1 | 1/2010 | Shelat et al. |
| 7,664,729 B2 | 2/2010 | Klein et al. |
| 7,685,109 B1 | 3/2010 | Ransil et al. |
| 7,698,321 B2 | 4/2010 | Hackworth |
| 7,734,961 B2 | 6/2010 | Almoustafa et al. |
| 7,818,313 B1 | 10/2010 | Tsimelzon et al. |
| 7,831,991 B1 | 11/2010 | Kiraly |
| 7,904,809 B2 | 3/2011 | Corning et al. |
| 7,937,482 B1 | 5/2011 | Vermeulen et al. |
| 7,970,861 B2 | 6/2011 | Simitci et al. |
| 7,984,043 B1 * | 7/2011 | Waas .................. 707/718 |
| 8,024,560 B1 | 9/2011 | Alten |
| 8,069,267 B2 | 11/2011 | Powers-Boyle et al. |
| 8,108,338 B2 | 1/2012 | Castro et al. |
| 8,108,771 B2 | 1/2012 | Chijiiwa et al. |
| 8,155,322 B2 | 4/2012 | Bellare et al. |
| 8,260,803 B2 | 9/2012 | Hsu et al. |
| 8,260,826 B2 | 9/2012 | Chen et al. |
| 8,306,919 B2 | 11/2012 | Sakamura et al. |
| 8,311,980 B2 | 11/2012 | Saito et al. |
| 8,468,244 B2 | 6/2013 | Redlich et al. |
| 8,484,716 B1 | 7/2013 | Hodgson et al. |
| 8,543,538 B2 | 9/2013 | Frantz et al. |
| 8,631,403 B2 * | 1/2014 | Soundararajan et al. ......... 718/1 |
| 8,655,939 B2 | 2/2014 | Redlich et al. |
| 8,667,267 B1 | 3/2014 | Garcia et al. |
| 8,713,046 B2 | 4/2014 | Vishnoi et al. |
| 8,732,674 B1 * | 5/2014 | Agha .................. 717/130 |
| 8,788,815 B1 | 7/2014 | Garcia et al. |
| 8,806,595 B2 | 8/2014 | Nimashakavi et al. |
| 8,892,599 B2 | 11/2014 | Lindblad et al. |
| 8,904,181 B1 | 12/2014 | Felsher et al. |
| 2002/0055989 A1 | 5/2002 | Stringer-Calvert et al. |
| 2002/0073322 A1 | 6/2002 | Park et al. |
| 2002/0138762 A1 | 9/2002 | Horne |
| 2002/0174194 A1 | 11/2002 | Mooney et al. |
| 2002/0184535 A1 | 12/2002 | Moaven et al. |
| 2002/0199119 A1 | 12/2002 | Dunnion et al. |
| 2003/0051036 A1 | 3/2003 | Wang et al. |
| 2003/0055868 A1 | 3/2003 | Fletcher et al. |
| 2003/0093633 A1 | 5/2003 | Thiesfeld et al. |
| 2004/0003322 A1 | 1/2004 | Collins et al. |
| 2004/0019807 A1 | 1/2004 | Freund |
| 2004/0059728 A1 | 3/2004 | Miller et al. |
| 2004/0059924 A1 | 3/2004 | Soto et al. |
| 2004/0103166 A1 | 5/2004 | Bae et al. |
| 2004/0128506 A1 | 7/2004 | Blakley, III et al. |
| 2004/0172421 A1 | 9/2004 | Saito et al. |
| 2004/0186832 A1 | 9/2004 | Jardin |
| 2005/0033957 A1 | 2/2005 | Enokida |
| 2005/0044311 A1 | 2/2005 | Lahiri et al. |
| 2005/0071708 A1 | 3/2005 | Bartfai et al. |
| 2005/0091244 A1 | 4/2005 | Marcotte |
| 2005/0114650 A1 | 5/2005 | Rockwood et al. |
| 2005/0138111 A1 | 6/2005 | Aton et al. |
| 2005/0171983 A1 | 8/2005 | Deo et al. |
| 2005/0182749 A1 | 8/2005 | Matsui |
| 2006/0020854 A1 | 1/2006 | Cardona et al. |
| 2006/0036850 A1 | 2/2006 | Enokida |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0224784 A1 | 10/2006 | Nishimoto et al. |
| 2006/0247897 A1 | 11/2006 | Lin |
| 2007/0100913 A1 | 5/2007 | Sumner et al. |
| 2007/0113188 A1 | 5/2007 | Bales et al. |
| 2007/0136442 A1 | 6/2007 | Palma et al. |
| 2007/0172066 A1 | 7/2007 | Davin |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0234115 A1 | 10/2007 | Saika |
| 2007/0255943 A1 | 11/2007 | Kern et al. |
| 2007/0282988 A1 | 12/2007 | Bornhoevd et al. |
| 2008/0104579 A1 * | 5/2008 | Hartmann .................. 717/136 |
| 2008/0140630 A1 | 6/2008 | Sato et al. |
| 2008/0163075 A1 | 7/2008 | Beck et al. |
| 2008/0244307 A1 | 10/2008 | Dasari et al. |
| 2008/0256486 A1 | 10/2008 | Hagiwara |
| 2008/0263006 A1 | 10/2008 | Wolber et al. |
| 2008/0276130 A1 | 11/2008 | Almoustafa et al. |
| 2008/0307181 A1 | 12/2008 | Kuszmaul et al. |
| 2009/0013029 A1 | 1/2009 | Childress et al. |
| 2009/0150675 A1 | 6/2009 | Cook |
| 2009/0150968 A1 | 6/2009 | Ozzie et al. |
| 2009/0177697 A1 | 7/2009 | Gao et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0010968 A1 | 1/2010 | Redlich et al. |
| 2010/0070769 A1 | 3/2010 | Shima et al. |
| 2010/0107048 A1 | 4/2010 | Takahara |
| 2010/0131817 A1 | 5/2010 | Kong et al. |
| 2010/0179855 A1 | 7/2010 | Chen et al. |
| 2010/0198972 A1 | 8/2010 | Umbehocker |
| 2010/0242102 A1 | 9/2010 | Cross et al. |
| 2010/0296652 A1 | 11/2010 | Nakayama et al. |
| 2010/0306286 A1 | 12/2010 | Chiu et al. |
| 2010/0313246 A1 | 12/2010 | Irvine et al. |
| 2010/0325713 A1 | 12/2010 | Kurita et al. |
| 2010/0332373 A1 | 12/2010 | Crabtree et al. |
| 2011/0023097 A1 | 1/2011 | McDiarmid et al. |
| 2011/0055578 A1 | 3/2011 | Resch |
| 2011/0078549 A1 | 3/2011 | Thueringer et al. |
| 2011/0119328 A1 | 5/2011 | Simitci et al. |
| 2011/0179160 A1 | 7/2011 | Liu et al. |
| 2011/0228668 A1 | 9/2011 | Pillai et al. |
| 2011/0236873 A1 | 9/2011 | Bowers |
| 2011/0246816 A1 | 10/2011 | Hsieh et al. |
| 2011/0246826 A1 | 10/2011 | Hsieh et al. |
| 2011/0276396 A1 | 11/2011 | Rathod |
| 2011/0276495 A1 | 11/2011 | Varadarajan et al. |
| 2011/0302417 A1 | 12/2011 | Whillock et al. |
| 2011/0307534 A1 | 12/2011 | Peng et al. |
| 2012/0016901 A1 | 1/2012 | Agarwal et al. |
| 2012/0036146 A1 * | 2/2012 | Annapragada .................. 707/764 |
| 2012/0036357 A1 | 2/2012 | Struik |
| 2012/0102072 A1 | 4/2012 | Jia et al. |
| 2012/0130874 A1 | 5/2012 | Mane et al. |
| 2012/0131341 A1 | 5/2012 | Mane et al. |
| 2013/0031240 A1 | 1/2013 | Byzek |
| 2013/0041872 A1 | 2/2013 | Aizman et al. |
| 2013/0054976 A1 | 2/2013 | Brown et al. |
| 2013/0124483 A1 | 5/2013 | Furuhashi et al. |
| 2013/0218840 A1 | 8/2013 | Smith et al. |
| 2013/0304761 A1 | 11/2013 | Redlich et al. |
| 2013/0318347 A1 | 11/2013 | Moffat |
| 2014/0188841 A1 * | 7/2014 | Sun et al. .................. 707/718 |
| 2014/0195558 A1 * | 7/2014 | Murthy et al. .................. 707/770 |
| 2015/0074151 A1 | 3/2015 | Chaiken et al. |

OTHER PUBLICATIONS

Corbett et al., "Spanner: Google's Globally Distributed Database," *Transactions on Computer Systems (TOCS)*, vol. 31, No. 3, 14 pages, Aug. 2013.

Lamport, L., "Time, clocks, and the ordering of events in a distributed system," *Communications of the ACM*, vol. 21, No. 7, pp. 558-565, Jul. 1978.

Stoller, S.D., "Detecting global predicates in distributed systems with clocks," *Distributed Computing*, vol. 13, No. 2, pp. 85-98, Feb. 2000.

Exam Report for GB1403929.1, Applicant: Cloudera, Inc, Mailed May 2, 2014, 6 pages.

"Hadoop: The Definitive Guide, 2nd Edition" copyright 2011 Tom White.

(56) References Cited

OTHER PUBLICATIONS

Heman, et al., "Positional Update Handling in Column Stores," http://event.cwi.nl/SIGMOD-RWE/2010/22-7f15a1/paper.pdf 12 pages, Jun. 2010.
Lamb et al., "The Vertica Analytic Database: C-Store 7 Years Later." http://arxiv.org/pdf/1208.4173.pdf (Section 3.7.1) Aug. 2012.
Partial European Search Report; Application No. 14187188.9; Applicant Cloudera, Inc. Mail Dated Feb. 6, 2015; pp. 7.
Yotaro Nakayama "Realization of Virtual Data Integration Platform using PostgreSQL", Unisys Technology Review Mar 2012; pp. 25-37. http://www.unisys.co.jp/tec_info/tr111/11103.pdf.
Chang, et al., "Bigtable: A Distributed Storage System for Structured Data", OSDI 2006, Seattle, Washington, USA, Nov. 6-8, 2006, 14 pages.
Canada Exam Report for application No. 2843459, mailing date May 22, 2015, 3 pages.
Canada Exam Report for application No. 2843459, mailing date Aug. 5, 2014, 3 pages.
European Examination Report for European Application No. 14157984.7, mailing date Jun. 16, 2015, 9 pages.
Exam Report for GB1403929.1, Applicant: Cloudera, Inc, Mailed Jul. 17, 2015, 10 pages.
Extended European Search Report for European Application No. 14187188.9; Applicant Cloudera, Inc. Mail Date Jul. 9, 2015; pp. 12.
Partial European Search Report for European Application No. 14187188.9; Applicant Cloudera, Inc. Mail Date Feb. 6, 2015; pp. 7.
Marcel Kornacker et al.: "Cloudera Impala: Real-Time Queries in Apache Hadoop, for Real I Cloudera Engineering Blog", Oct. 24, 2012. Retrieved from Internet: http://blog.cloudera.com/blog/2012/10/cloudera-impala-real-time-queries-in-apache-hadoop-for-real/ [retrieved on Jun. 8, 2015].

U.S. Appl. No. 13/854,773, filed Apr. 1, 2013, Kirkland et al.
Beomseok Nam et al: "Spatial indexing of distributed multidimensional datasets", Cluster Computing and the Grid, 2005. CCGRID 2005. IEEE International Symposium on Cardiff—Wales, UK May 9-12, 2005, Piscataway, NJ, USA,IEEE, Piscataway, NJ, USA, vol. 2, May 9, 2005, pp. 743-750.
Chapter 25: Distributed Databases ED -; ; Ramez Elmasri; Shamkant B Navathe (eds), Jan. 1, 2011, Fundamentals of Database Systems (Sixth Edition), Addison-Wesley, pp. 877-927.
Cheng, Security Attack Safe Mobil and Cloud-Based One-Time Password Tokens Using Rubbing Encryption Algorithm, ACM, Jun. 2011, pp. 304-336.
Du et al., "A Pairwise Key Predistribution Scheme for Wireless Sensor Networks," ACM, May 2005, vol. 8 Issue 2, pp. 228-258.
European Search Report for European Application No. 14157984.7, mailing date Jun. 6, 2014, 10 pages.
Kim et al., Design and Implementation of a Private and Public Key Crypto Processor and Its Applicaiton to a Security System, IEEE, Feb. 2004, vol. %0, Issue 1, pp. 214-224.
Ko et al., "A Study of Encryption Algorithm for RFID tag (SEED: 8 Rounds×64 bit block)," IEEE, s008, pp. 672-677.
Kossmann D: "The State of the Art in Distributed Query Processing", ACM Computing Surveys, ACM, New York, NY, us, vol. 32, No. 4, Dec. 1, 2000, pp. 422-469.
Non-Final Office Action for U.S. Appl. No. 13/362,695, mailed Apr. 29, 2013, 23 pgs.
Tamer Dzsu et al: "Principles of Distributed Database Systems", Principles of Distributed Database Systems, XX, XX, Jan. 1, 1991, pp. 74-93.

* cited by examiner

LOW LATENCY QUERY ENGINE FOR APACHE HADOOP

BACKGROUND

APACHE HADOOP™ project (hereinafter "HADOOP™") is an open-source software framework for developing software for reliable, scalable and distributed processing of large data sets across clusters of commodity machines. HADOOP™ includes a distributed file system, known as HADOOP DISTRIBUTED FILE SYSTEM (HDFS™). HDFS™ links together the file systems on local nodes to form a unified file system that spans the entire HADOOP™ cluster. HADOOP™ also includes HADOOP™ YARN that provides a framework for job scheduling and cluster resource management that is utilized by a programming framework known as MapReduce. HADOOP™ is also supplemented by other Apache projects including APACHE HIVE™ (hereinafter "HIVE™") and APACHE HBASE™ (hereinafter "HBASE™"). HIVE™ is a data warehouse infrastructure that provides data summarization and ad hoc querying. HBASE™ is a scalable, distributed NoSQL (No Structured Query Language) database or data store that supports structured data storage for large tables.

MapReduce processes data in parallel by mapping or dividing a work into smaller sub-problems and assigning them to worker nodes in a cluster. The worker nodes process the sub-problems and return the results, which are combined to "reduce" to an output that is passed on a solution. MapReduce is a batch processing framework, and is optimized for processing large amount of data in parallel by distributing the workload across different machines. MapReduce offers advantages including fault tolerance, but also suffers from severe disadvantages such as high latency.

The latency in MapReduce is a result of its batch oriented map/reduce model. In MapReduce, during an execution, the output of the "map" phase serves as the input for the "reduce" phase, such that the "reduce" phase cannot be completed before the "map" phase of execution is complete. Furthermore, all the intermediate data is stored on the disc before download to the reducer. Because of the above reasons, MapReduce adds latency which can cause a simple query started through MapReduce to take a long time to execute.

HIVE™ is a framework that lies on top of MapReduce. HIVE™ translates a language that looks like Structured Query Language (SQL) to MapReduce code, making data access in a HADOOP™ cluster much easier for users. HIVE™, however, still uses MapReduce as its execution engine, under the covers, and inherits all the disadvantages of MapReduce. Due to this, simple HIVE™ queries can take a long time to execute.

DETAILED DESCRIPTION

Figure 1:
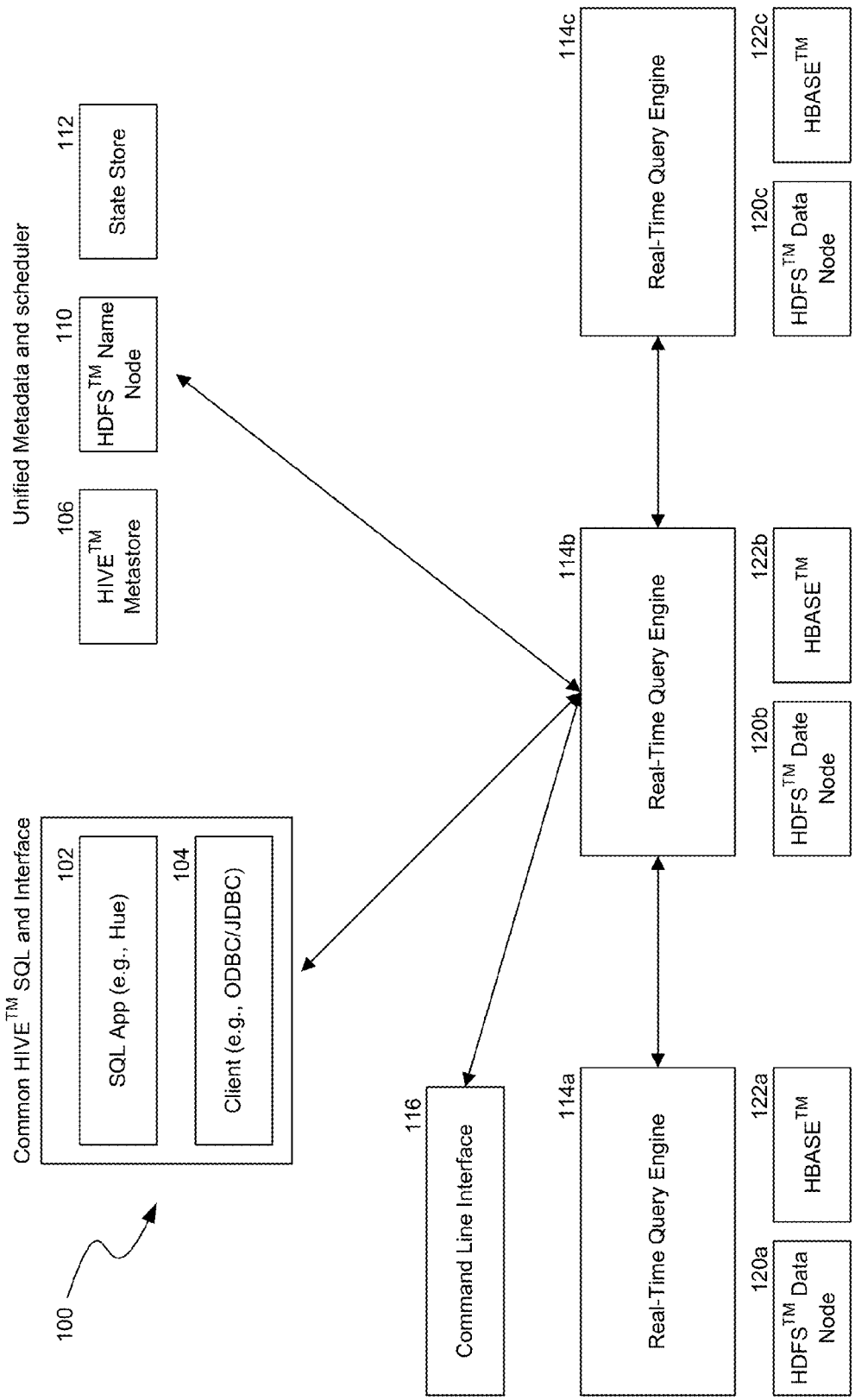
FIG. 1 depicts a diagram illustrating an example environment in which a low latency query engine may be deployed.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include a low latency (LL) query engine for HADOOP™. Embodiments of the present disclosure also include systems and methods for executing queries, in real time or near real time, on data stored in HADOOP™. Embodiments of the present disclosure further include systems and methods for executing ad hoc queries, on data of any format, stored in HADOOP™.

The low latency (LL) query engine for HADOOP™ as disclosed provides an alternate processing framework that offers fast, interactive query results and uses a familiar SQL query syntax. The low latency (LL) query engine does not use MapReduce to generate results, but instead queries the data directly via its daemons, which are spread across the HADOOP™ cluster.

In one embodiment, the low latency (LL) query engine provides a mechanism for fast querying of unstructured and/or structured big data. The low latency (LL) query engine can rapidly return information in response to queries. In many cases, results to queries, even on large amounts of data, can be returned in real-time or near real-time. Unlike MapReduce which starts jobs which then query the data, the low latency (LL) query engine performs queries directly on data stored in HDFS™ and/or in HBASE™ tables. The direct query capability provides users the ability to perform high speed queries on data as the data is being ingested in to the system.

In one embodiment, the low latency benefits of the low latency (LL) query engine allows users to perform queries in an interactive manner. With existing query engines such as MapReduce, even a simple query can take tens of minutes. As a result, a user has to wait that long to see a result, and start another query.

In another embodiment, the low latency (LL) query engine implements a schema-on-read model that decouples processing from data storage. Regardless of the format in which data is stored in the underlying storage layer of HDFS™ and HBASE™ the low latency (LL) query engine directly queries such data using relevant schema extracted at run time. By not being coupled to a rigid schema, the low latency (LL) query engine allows users to ask ad hoc exploratory questions that can lead to insights and other discovery.

Example Environment for Deploying a Low Latency (LL) Query Engine

FIG. 1 depicts a diagram illustrating an example environment 100 in which a low latency (LL) query engine may be deployed. Environment 100 depicts a client 104 such as Java Database Connectivity (JDBC) client, Open Database Connectivity (ODBC) client, and the like that provides API and other tools for connecting and/or accessing a HADOOP™ cluster. SQL applications 102 such as Hue, provide a user interface for HADOOP™ to run queries or jobs, browse the HDFS™, create workflows and the like. Environment 100 also includes a command line interface 116 for issuing queries to the low latency (LL) query engine daemons running on data nodes 120a-c that comprise the HADOOP™ cluster. In one embodiment, the client 104, the web application 102 and the command line interface 116, each or together may be commonly referred to as a client.

Environment 100 depicts a plurality of data nodes 120a-c. A low latency (LL) query engine daemon runs on each of the data nodes. A low latency (LL) query engine daemon is a long running process that coordinates and executes queries. Each instance of the low latency (LL) query engine daemon can receive, plan and coordinate queries received via the clients 102/104. For example, the low latency (LL) query engine can divide a query into fragments, which are distributed among remote nodes running an instance of the low latency (LL) query engine for execution in parallel. Some of the data nodes 120a-c may run just HDFS™, while others may run HBASE™ region servers 122a-c. The queries are executed directly on the HDFS™ (e.g., 120a-c) and/or HBASE™ (e.g., 122a-c).

Environment 100 depicts unified metadata and scheduler components such as HIVE™ metastore 106, YARN 108, HDFS™ name node 110 and/or state store 112. The HIVE™ metastore 106 includes information about the data available to the low latency (LL) query engine. Specifically, the HIVE™ metastore includes the table definition, i.e., mapping of the physical data into the logical tables that are exposed. The YARN 108 performs job scheduling and cluster resource management. The HDFS™ name node (NN) 110 includes the details of the distribution of the files across data nodes to optimize local reads. In one implementation, the name node 110 may even include information concerning disk volumes the files sit on, on an individual node.

The state store 112 is a global system repository which runs on a single node in the cluster. The state store 112 in one implementation can be used as a name service. All low latency (LL) query engine daemons, at start up, can register with the state store and get membership information. The membership information can be used to find out about all the low latency (LL) query engine daemons that are running on the cluster. The state store 112, in a further implementation, can be used to provide metadata for running queries. The state store 112 can cache metadata and distribute the metadata to the low latency (LL) query engine daemons at start up or another time. When the state store fails, the rest of the system may continue to operate based on last information received from the state store. In a further implementation, the state store can store and distribute other system information such as load information, diagnostics information, and the like that may be used to improve the functioning and/or performance of the HADOOP™ cluster.

Figure 2:
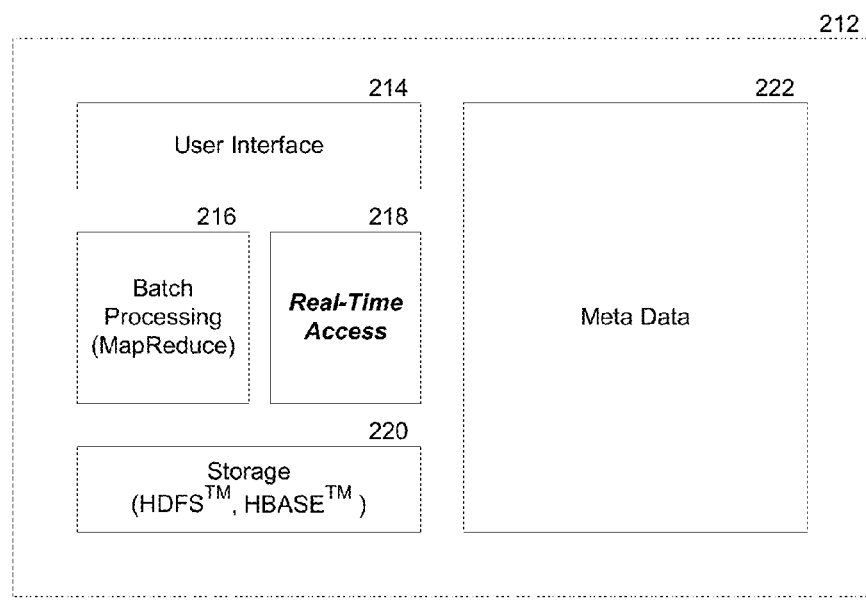
FIG. 2 depicts a block diagram illustrating example components of a unified platform supporting batch-oriented and real-time, ad hoc queries.

FIG. 2 depicts a block diagram illustrating example components of a unified HADOOP™ platform 212 supporting batch-oriented and real-time, ad hoc queries. The unified HADOOP™ platform 212 supports distributed processing and distributed storage. The unified HADOOP™ platform 212 includes a user interface 214, storage 220 and meta data 222 components. The user interface 214 includes HIVE™ interfaces such as ODBC driver, JDBC driver, Hue Beeswax, and the like. The user interface 214 also includes SQL support. Via the user interface 214, queries can be issued, data can be read from or written to storage 220, etc. The storage 220 includes HDFS™ and/or HBASE™ storage. The HDFS™ may support various file formats, including but not limited to: text file, sequence file, RC file, Avro, and the like. Various compression codecs including snappy, gzip, deflate, bzip, and the like may also be supported. The metadata 222 may include, for example, information such as tables, their partitions, schema-on-read, columns, types, table/block locations, and the like. The metadata 222 may leverage existing HIVE™ metastore, which includes mapping of HBASE™ table, predicates on row key columns mapped into start/stop row, predicates on other columns mapped into single column value filters, and the like.

Existing HADOOP™ platform uses a batch oriented query engine (i.e., MapReduce) for batch processing 216 of HADOOP™ data. The batch processing capability of MapReduce is complemented by a real-time access component 218 in the unified HADOOP™ platform 212. The real-time access component 218 allows real-time, ad hoc SQL queries to be performed directly on the unified storage 220 via a distributed low latency (LL) query engine that is optimized for low-latency. The real-time access component 218 can thus support both queries and analytics on big data. Existing query engines (e.g., MapReduce), on the other hand, feature tight coupling of the storage, metadata and the query, which means that such query engines would need to read the data remotely from HADOOP™, and convert it into their storage format before they can do queries because of the tight coupling.

Figure 3A:
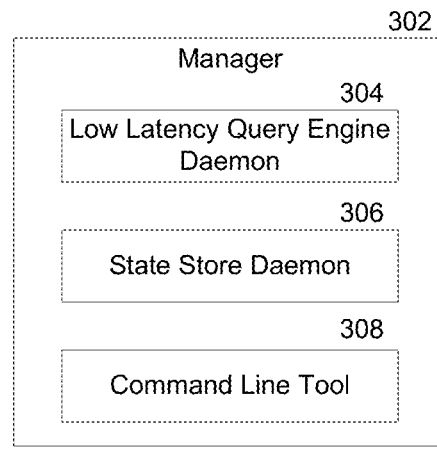
FIGS. 3A-3B depict block diagrams of example components of an installation manager and a low latency query engine installed on a data node in a Hadoop cluster to provide interactive, real-time Structured Query Language (SQL) queries directly on a unified storage layer.

FIG. 3A depicts a block diagram of example components of an installation manager 302 for installing components of a low latency (LL) query engine in a HADOOP™ cluster to provide interactive, real-time SQL queries directly on a unified storage layer.

The manager 302 is an installation manager that can automatically install, configure, manage and monitor the low latency (LL) query engine. Alternately, the low latency (LL) query engine may be installed manually. The installation manger 302 installs three binaries including an low latency (LL) query engine daemon 304, a state store daemon 306 and a low latency (LL) query engine shell 308. As described above, the low latency (LL) query engine daemon 304 is a service or process that plans and executes queries against HDFS™ and/or HBASE™ data. The low latency (LL) query engine daemon is installed on each data node in the cluster. The state store daemon 306 is a name service that tracks the location and status of all the low latency (LL) query engine daemon instances in the cluster. The state store daemon 306 can also be a metadata store for providing metadata and/or other diagnostic information in some implementations. The low latency (LL) query engine shell 308 is a command line interface for issuing queries to a low latency (LL) query engine daemon, and is installed on a client.

Figure 3B:
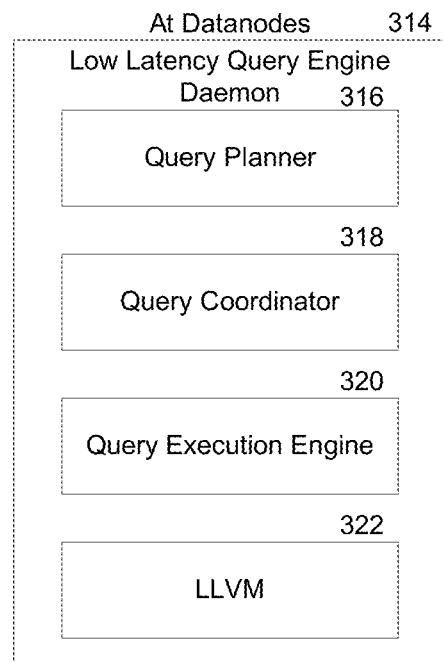

FIG. 3B depicts a block diagram of example components of a low latency (LL) query engine daemon installed on each data node in a HADOOP™ cluster. A low latency (LL) query engine daemon 304 is installed at each data node 314, as depicted. The low latency (LL) query engine daemon 304 includes a query planner 316, a query coordinator 318 and a query execution engine 320 in one embodiment. The query planner 314 turns query requests from clients into collections of plan fragments, and provides the planned fragments to the query coordinator 318. The query planner 314 may constitute the front end of the low latency (LL) query engine, and may be written in Java, or another suitable language, to facilitate interaction with the rest of the HADOOP™ environment, such as the meta store/state store, APIs, and the like. The query planner 314 can use various operators such as Scan, HashJoin, HashAggregation, Union, TopN, Exchange, and the like to construct a query plan. Each operator can either materialize or generate data or combine data in some way. In one implementation, for example, the query planner can create a lefty plan or tree of one or more operators (e.g., manually or using an optimizer). The scan operator allows a plan to be broken up along scan lines or boundaries. Specialized scan nodes may be present for all the different storage managers. So, for example, there may be an HDFS™ scan node and an HBASE™ scan node, each of which can internally employ different process for different file formats. Some plans combine data for hash aggregation which can fill up a hash table and then output the aggregate results. A union operator can merge the output from different plan fragments. A TopN operator can be the equivalent of order by with the limit. The exchange operator can handle the data exchange between two plan fragments running on two different nodes.

The query coordinator 318 initiates execution of the planned fragments across all of the low latency (LL) query engine daemons that are involved in the query. The query coordinator 318 uses the membership information from the state store and/or location information for the data blocks from the Name Node to determine or identify the low latency (LL) query engine daemons on data nodes for executing query plan fragments. In one implementation, the query coordinator 318 can also apply any predicates from the query to narrow down to the set of files and blocks the plan fragments should be run against. The query coordinator 318 can also perform the final aggregation or merge of data from the low latency (LL) query engine daemons in remote nodes. In one implementation, the low latency (LL) query engine daemons may pre-aggregate some of the data, so that the aggregation is distributed across the nodes, thereby speeding up the query.

The query execution engine 320 executes the planned query fragments locally on the HDFS™ and HBASE™. For example, the query execution engine 320 initiates the scan and/or any other query operators. The query execution engine 320 is written in C++, but may also be written in any other suitable language such as Java. The query execution engine is an execution engine that is separate from MapReduce. While the query execution engine uses the infrastructure that provides the data (e.g., HDFS™ and HBASE™), the query execution engine does not utilize any of the infrastructures that run map reductions, such as job trackers or task trackers.

In one embodiment, the query execution engine 320 can include a component 322, a low level virtual machine (LLVM), an optimizer, or other compiler infrastructure, for run-time code generation in order to transform interpretive code into a format that can be efficiently executed by the central processing unit (CPU). Typical relational database systems for instance, have interpretive code for evaluating expressions to extract data from indices etc. The query execution engine avoids this problem by using low level virtual machines (LLVMs) to more tightly couple code with hardware. For example, an expression where A equals B over A+B equals C in a query can be evaluated by making three function calls. Instead of making the three function calls, LLVM uses the operations that the CPU provides in order to evaluate the expression and achieve speed gains.

In a further embodiment, the low latency (LL) query engine can also use special CPU instructions, in order to, for example, perform text processing and/or other resource intensive processes. By way of another example, hash value computations may be performed using a special Cyclic Redundancy Check (CRC32) instruction to achieve speed gains.

Example Query Processing

Figure 4:
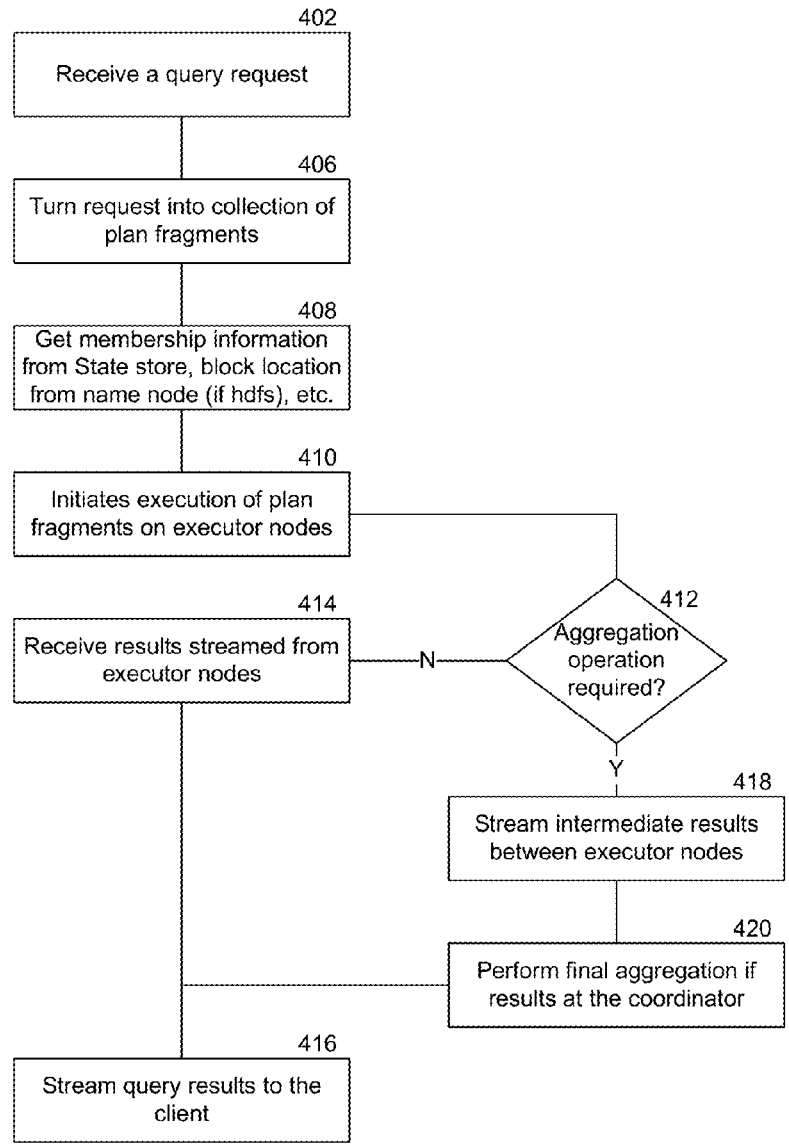
FIG. 4 depicts an example method of processing an SQL query by a low latency query engine for Hadoop.

FIG. 4 depicts an example method of processing an SQL query by a low latency (LL) query engine for HADOOP™. As described above, an instance of the low latency (LL) query engine runs on each node that has data (e.g., HDFS™ and HBASE™) in the HADOOP™ cluster. A user submits a query via a client (e.g., ODBC client/Hue/command line tool) to any of the low latency (LL) query engine demons. Via the client (e.g., the ODBC client), the user can target any of the low latency (LL) query engine daemons, by directly connecting to a particular low latency (LL) query engine daemon on a data node. Alternately, a round robin strategy may be used to spread the load across all the remote daemons in the cluster.

In one implementation, at block 402, a user facing side of a low latency (LL) query engine daemon (i.e., a query planner) receives or accepts a query request from the user. The query planner turns the request into a collection of plan fragments at block 406, and hands off the query plan fragments to a query coordinator in the same node. The query coordinator serves as a single instance that coordinates the entire plan of execution across all other low latency (LL) query engine daemons or remote daemons involved in the query. In one implementation, to coordinate the entire plan of execution, the query coordinator receives or obtains membership information from the state store and location information from the name node (for HDFS™ query) at block 408. Using the membership information and the block location information, the query coordinator determines which daemons or nodes in the cluster should receive the query plan fragments for execution. At block 410, the query coordinator distributes the query plan fragments to the nodes having relevant data to initiate execution of the plan fragments against the data local to each node.

During execution, all the nodes can talk to each other in a streaming fashion. In one implementation, if the query does not involve aggregation or blocking operators as determined at decision block 412, results streamed from the query executors (i.e., query execution engines of nodes receiving the query plan fragments) are received by the query coordinator at block 414. The results are then streamed back to the user via the client at block 416.

Alternately, if a blocking or aggregator operator is present in the query, as determined at decision block 412, intermediate results are streamed between the query executors and pre-aggregated at one or more the nodes at block 418. At block 420, the query coordinator performs an aggregation or merge of the pre-aggregated results to determine the final result, which is then sent to the user via the client at block 416.

FIGS. 5A-5F depict example flows for query execution using a low latency (LL) query engine for HADOOP™.

Figure 5A:
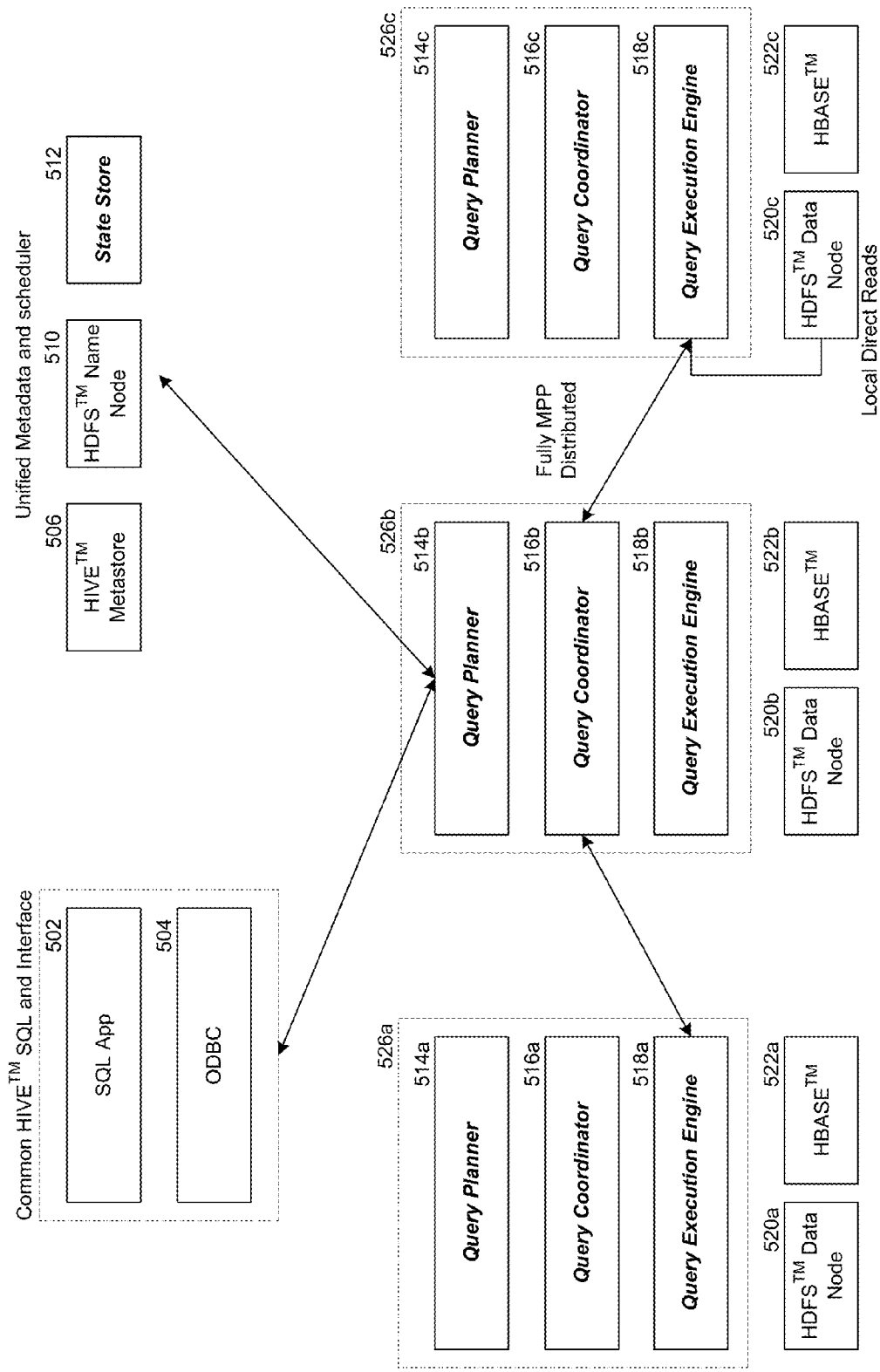
FIGS. 5A-5F depict example flows for query execution using a low latency query engine for Hadoop.

Referring to FIG. 5A, the HADOOP™ environment 500 for operating the low latency (LL) query engine includes a common HIVE™ SQL and interface including an SQL application 502 and a client 504 such as the ODBC client, JDBC client, and the like. The environment also includes unified meta data and scheduler entities such as the HIVE™ meta store 506, YARN 508, HDFS™ name node 510 and/or state store 512. As depicted in this example, the HADOOP™ environment includes a cluster of three HDFS™ data nodes 520a-c, each of which has an instance of the low latency (LL) query engine daemon 526a-c respectively, running on top. The client connects to only one instance of the low latency (LL) query engine daemon (e.g., 526b). The low latency (LL) query engine daemon connects to or communicates with one or more of the unified meta data and scheduler entities. Furthermore, as depicted, the low latency (LL) query engine daemons connect to each other for distributed and fully massively parallel processing (MPP). It should be noted that low latency (LL) query engine daemons 526a-c on data nodes 520a-c and the state store 512 are the components of the low latency (LL) query engine that provides real-time, ad hoc query capability in HADOOP™. The low latency (LL) query engine leverages existing common HIVE™ SQL and Interface 502 and 504, HIVE™ metastore 506, YARN 508, HDFS™ name node 510 and the unified storage layer comprising the HDFS™ data node 520a-c and HBASE™ region servers 522a-c.

Figure 5B:
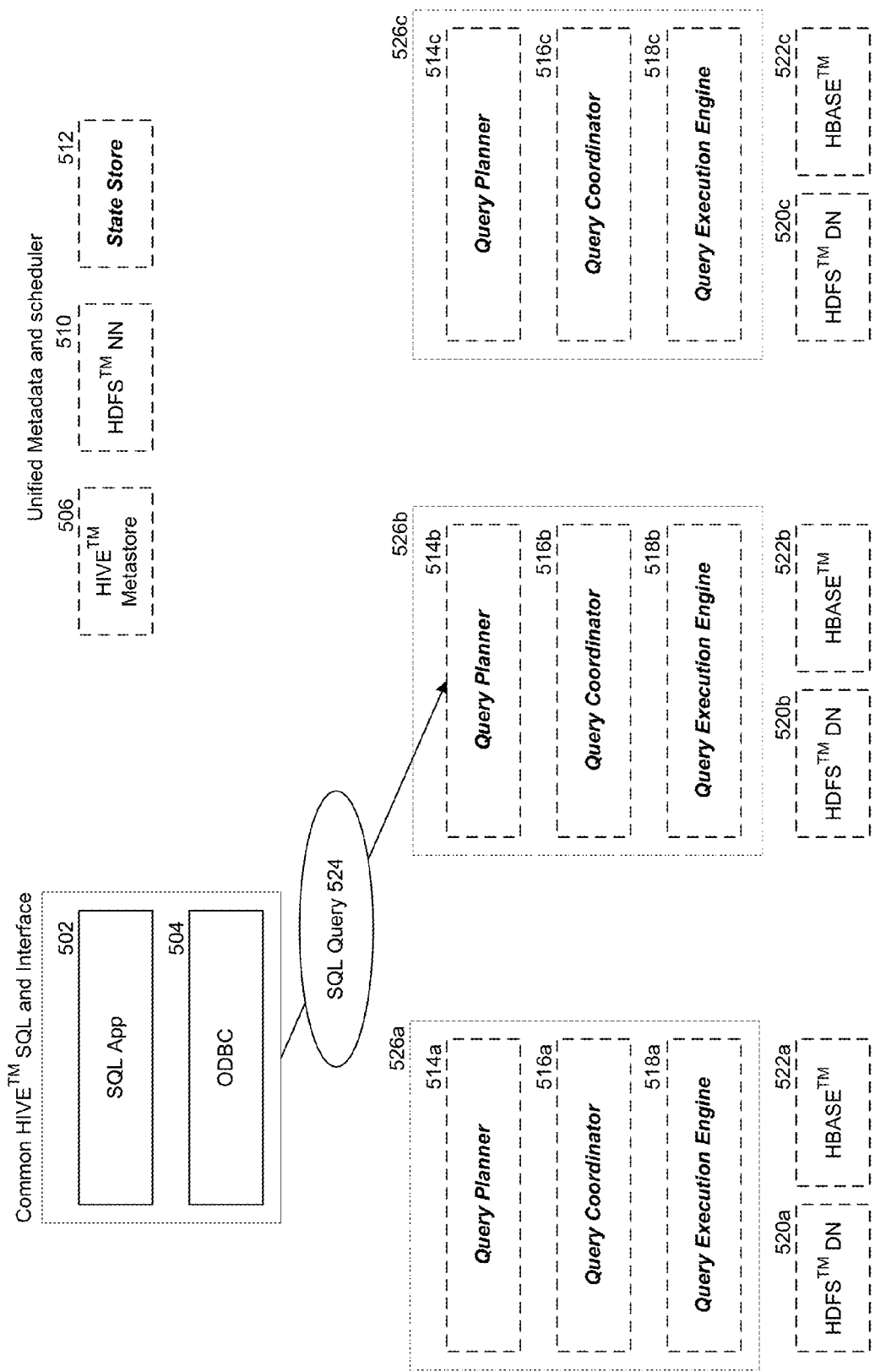

Referring to FIG. 5B, a user using the SQL application 502 submits an SQL query request 524 via a client 504. The SQL query request can go any of the nodes 526a-c. In one implementation, the node to which the SQL query request should be sent can be specified via the client/application. Alternately, a node can be selected based on a round robin or other scheduling method for load balancing. An instance of the low latency (LL) query engine daemon 526b on the HDFS™ data node 520b is depicted as the recipient of the SQL query request 524. The SQL query request 524 interacts with the query planner 514b of the low latency (LL) query engine daemon 526b.

Figure 5C:
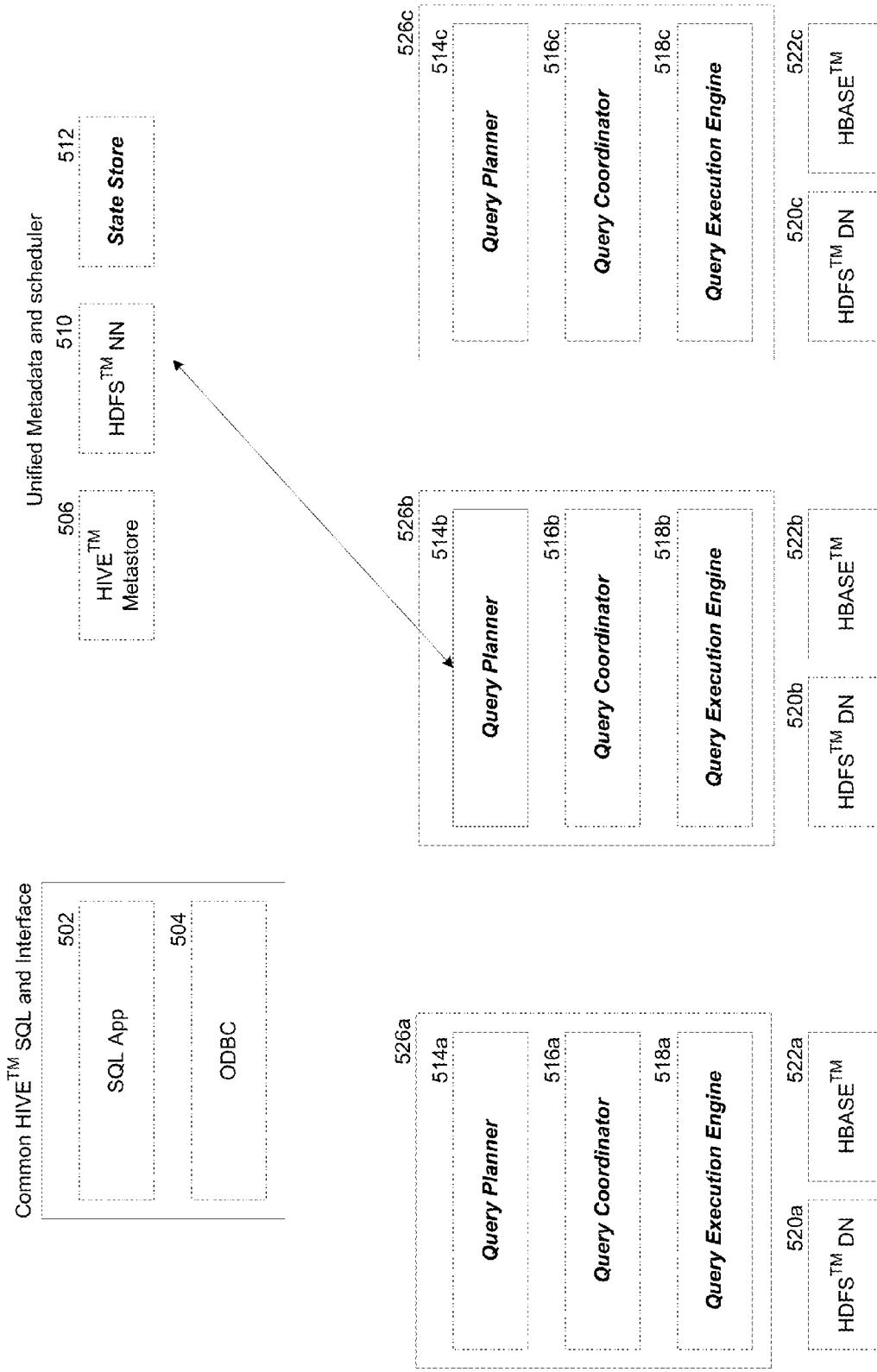

Referring to FIG. 5C, the query planner 514b and/or the query coordinator 516b that received the query request 524, communicates with one or more of the unified meta data and scheduler entities to get information for creating a plan for the query request and/or coordinating execution of the query request. For example, the query planner and/or coordinator may determine which data nodes are available, and the location of data blocks relevant to the query. In HDFS, replicas of data blocks are stored in various data nodes. The query planner and/or coordinator can communicate with the name node 510 to determine where each of the replicas for each data block is stored and can select one of the replicas to run the query. A round robin or another method may be used in selecting a replica from the group of replicas of data blocks. The query planner 514b can parse and analyze the query request to determine tasks that can be distributed across the low latency (LL) query engine daemons in the cluster.

Figure 5D:
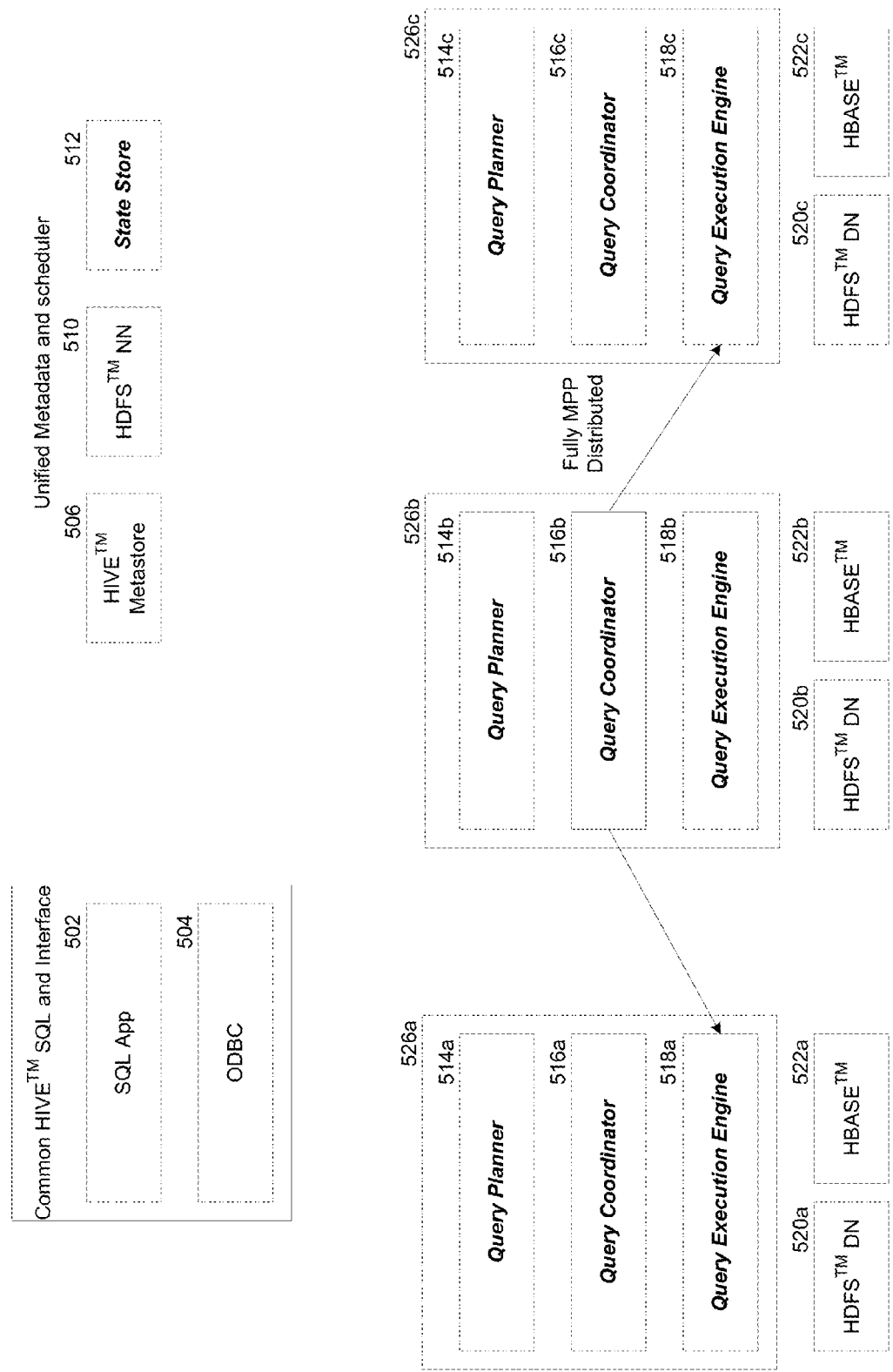
Figure 5E:
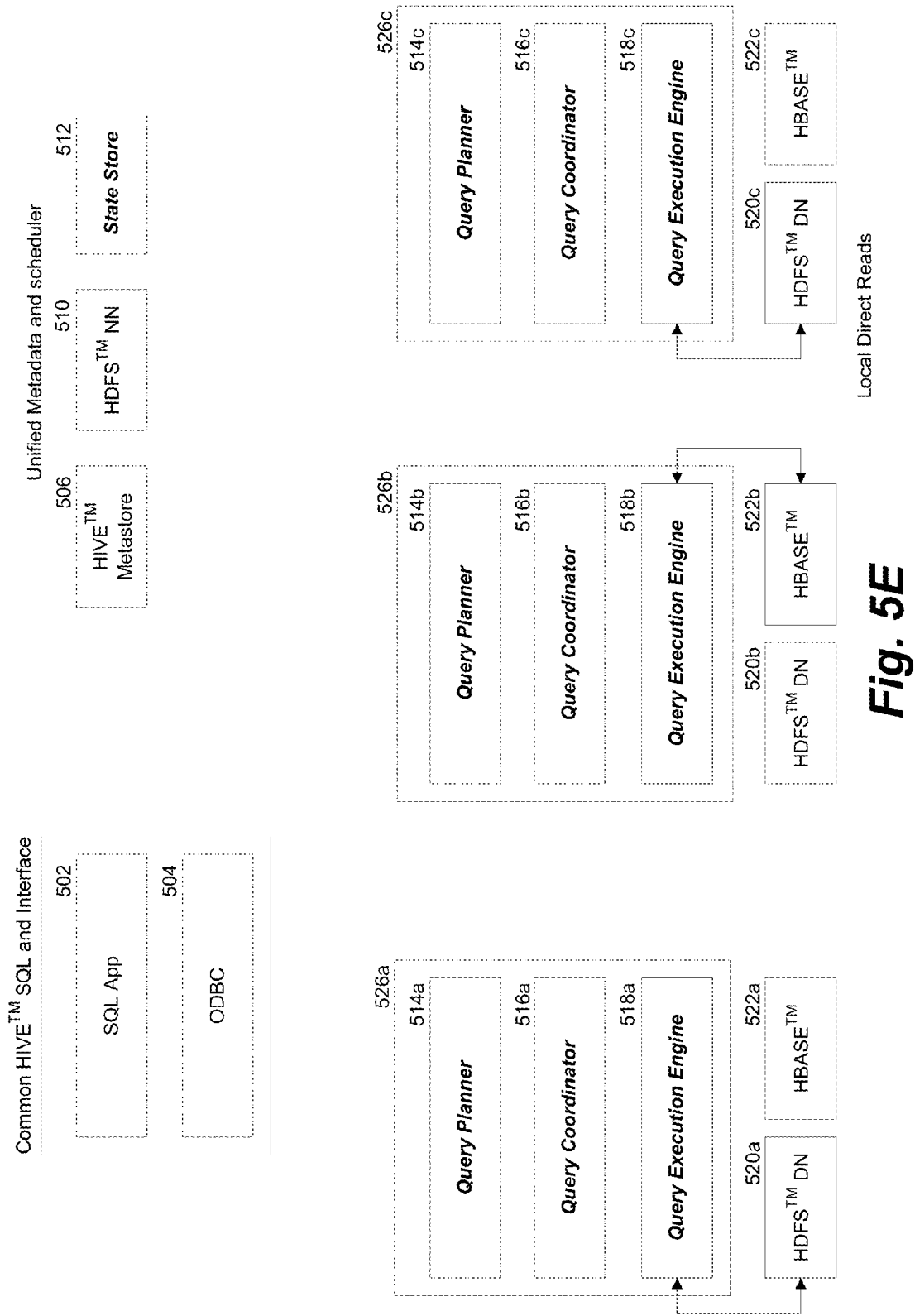

Referring to FIG. 5D, the query coordinator 516b hands off the tasks or plan fragments from the query planner 514b to the query execution engines 518a-c of each of the nodes that hold data relevant to the query request. All three query execution engines run in parallel and distributed fashion. Referring to FIG. 5E, the query execution engines 518a-c execute the plan fragments locally on the nodes that hold the relevant data. For example, the query execution engine 518c performs a local direct read of HDFS™ data stored in HDFS™ data node 520c. Similarly, the query execution engines 518a and 518b perform local direct reads of data stored in HDFS™ data node 520a and HBASE™ 522b respectively. The query execution engines 518a-c may also initiate other query operators specified in the plan fragments.

Figure 5F:
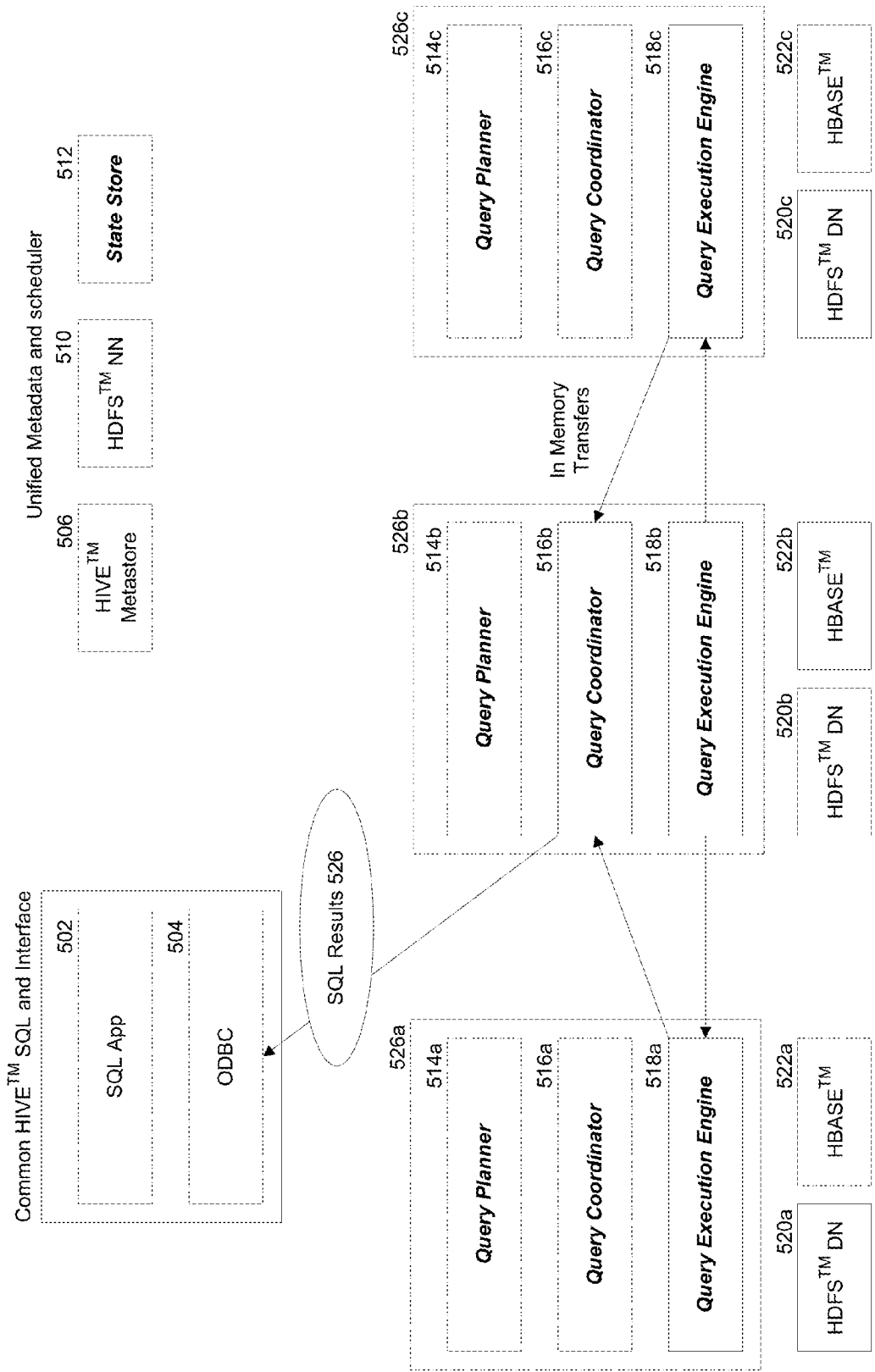

Referring to FIG. 5F, results from the query executions engines 518a-c are passed to the query coordinator 516b via in memory transfers. If the query involves block operations (e.g., TopN, aggregation, etc.), intermediate results are streamed between the RT query engine demon nodes for pre-aggregation, and the final result is aggregated at the query coordinator 516b. Keeping query results or intermediate results in memory provides performance improvement as the transfers are not bound by the speed of the disks. The final results 528 to the query request 524 is then returned by the query coordinator 516b to the user via the client 504 and the SQL application 502.

Figure 6:
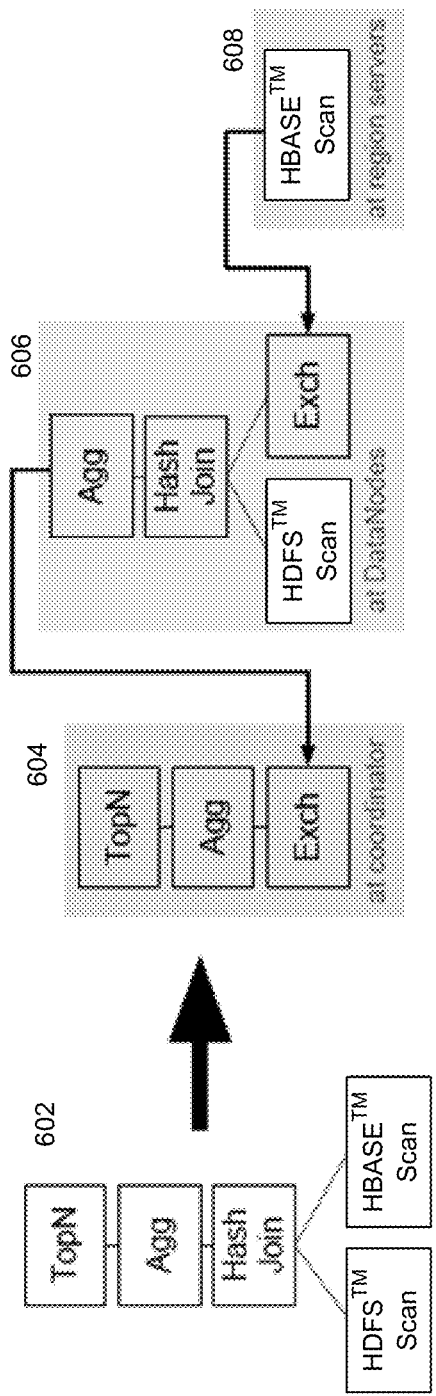
FIG. 6 depicts a block diagram illustrating execution of an example query plan by a low latency query engine for Hadoop.

FIG. 6 depicts a block diagram illustrating execution of an example query plan by a low latency (LL) query engine for HADOOP™.

The query plan 602 corresponds to an example query provided below.

```
SELECT state, SUM(revenue)
FROM HdfsTbl h JOIN HbaseTbl b ON (...)
GROUP BY 1 ORDER BY 2 desc LIMIT 10
```

The query plan 602 comprises an HDFS™ scan and an HBASE™ scan, joining of the data from the two scans and computing an aggregation with a grouping (TopN) operation. The query plan 602 is broken along scan lines to form separate plan fragments. For example, one plan fragment may include an HBASE™ data scan and another plan fragment may include an HDFS™ data scan. The HBASE™ scan is run locally at region servers that hold the HBASE™ data relevant to the query as depicted at block 608. The HDFS™ scan is also run locally on data nodes holding the relevant HDFS™ data as depicted in block 606.

In one implementation, it may be more optimal to execute the join operation close to the scanners that produce the actual data. As depicted in block 606, the data nodes have exchange nodes or operators that receive data broadcast from the HBASE™ scans. At the data nodes, the hash join operation builds an in memory hash table and performs the joining operation, following by a pre-aggregation operation. The output of the pre-aggregation operation is then sent to the final plan fragment 604. The final plan fragment has only once instance and runs on the query coordinator handling the query. At the coordinator, an exchange node receives the data from the pre-aggregation and performs an aggregation operation in another hash table. The output of the aggregation operation is then run though a TopN operation that produces the final result that is provided to the client. As depicted, both HDFS™ and HBASE™ scans can occur in parallel. Similarly, the join and aggregation operations can also occur in parallel at data nodes holding the relevant data. The parallel execution, along with in-memory transfers of intermediate data, can result in low latency response to queries.

Consider that the RT query engine illustrated in FIGS. 5E-F is processing the query of FIG. 6. Referring to FIG. 5E, the query execution engines 518a and 518c scan HDFS™ data on the HDFS™ data node 520a and 520c respectively. The query engine 518b scans HBASE™ data 522b. Referring to FIG. 5F, the query execution engine 518b performing the HBASE™ scan, broadcasts the data from the scan to the two execution engines 518a and c performing the HDFS™ scans as depicted. Each of the query execution engines 518a and 518c in turn performs a join operation, and sends pre-aggregation results to the initiating query coordinator 516b. The initiating query coordinator then aggregates the results and performs a TopN operation to obtain a final result that is then provided to the client 504 as SQL result 528. In implementations where there is no need for any aggregation, data streamed to the query coordinator from the query execution engines may be streamed to the client in a very fast and efficient manner.

Figure 7:
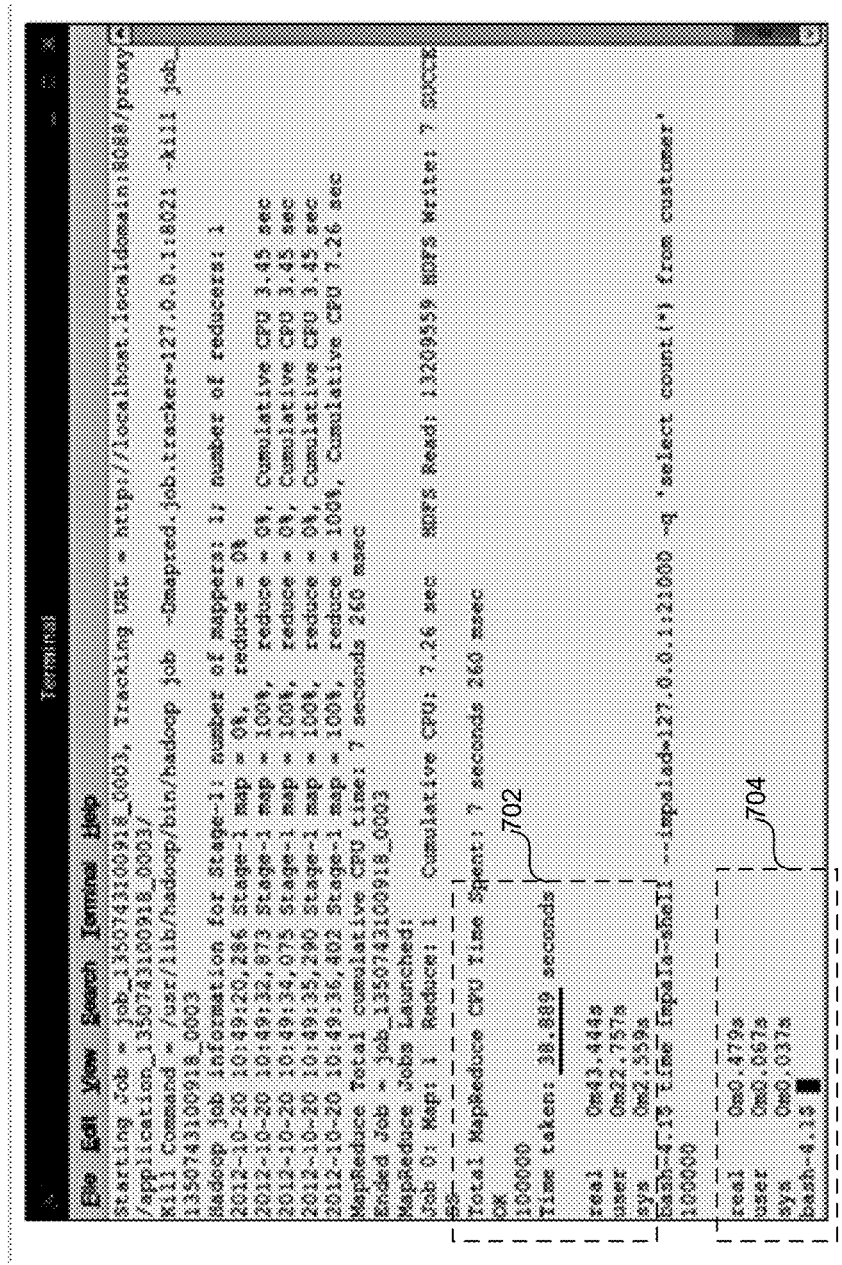
FIG. 7 depicts a screenshot illustrating example execution times for a query performed on a data set using Hive and a low latency query engine.

FIG. 7 depicts a screenshot illustrating example execution times for a query performed on a data set using HIVE™ and a low latency (LL) query engine. The query is performed on a virtual machine with example data set to determine the number of entries in a table using HIVE™/MapReduce and the low latency (LL) query engine. Since a query that is executed in HIVE™ must run one or more MapReduce jobs to retrieve the results, it takes HIVE™ almost 40 seconds to execute a single COUNT query. Much of the 40 seconds is actually used to start up and tear down the MapReduce job. When the same COUNT query is executed on the same data set using the low latency (LL) query engine, the execution time is significantly reduced to about 0.5 seconds as depicted. The significant reduction in the query execution time illustrates the advantage of the low latency (LL) query engine in providing real-time interaction with the HADOOP™ cluster to perform analytical, transactional, and any other queries without having to wait a long time in between queries.

Data Management

In one embodiment, the low latency (LL) query engine provides the advantage of low latency which allows users to query large volumes of data and obtain answers at much faster speed than possible using the existing batch processing framework of HIVE™ and MapReduce. In a further embodiment, the RT query engine provides flexibility in defining schemas that can be used to search for hidden insights in large volumes of data.

In relational database management systems (RDBMS), a schema is defined first (i.e., schema-on-write model). The format of the input data is converted to the proprietary format of the database prior to storing the input data. A schema-on-write model works well for answering known questions. If a previously unknown question needs to be answered, new data may need to be captured. However, with a rigid schema, the database system cannot start accepting new data that does not match the schema. To fit in the new data, the schema must be modified or amended. In order to modify or upgrade the schema to capture new data, data architects typically need to change all the systems connected to the database system to, for example, correctly parse and load the new data, read or recognize the new data, and the like. This process of upgrading the schema and ensuring that all the systems that are tightly coupled with the database system work together, can take a long time. Until then, the new data cannot be captured to answer the question.

The low latency (LL) query engine decouples the processing of the data from the storing of data. For example, the underlying storage system in Hadoop can accept files in their original native format (e.g., tab-delimited text files, CSV, XML, JSON, images, etc.). The low latency (LL) query engine uses a schema-on-read model to translate the data stored in any format into an economical in memory format (e.g., Tuple format) on the fly. For example, when the low latency (LL) query engine interacts with text data, the low latency (LL) query engine can read the text data once, perform a transformation, and the data from the transformation can be handled in the economical in memory format till all the processing is complete.

The low latency (LL) query engine leverages an existing HADOOP™ components such as the HIVE™ metastore and the underlying unified storage (HDFS™ and HBASE™). The data that the low latency (LL) query engine queries against is simultaneously available to MapReduce. For example, a query is being executed, the low latency (LL) query engine parses the file (any format) and extracts the relevant schema from the meta store at run time. In other database systems, this is not possible as the format of the data and the definition of how a user interacts with the data (i.e., schema in the meta store) are tightly coupled. Thus a database file stored in Oracle database can be read by Oracle and no other framework.

Figure 8:
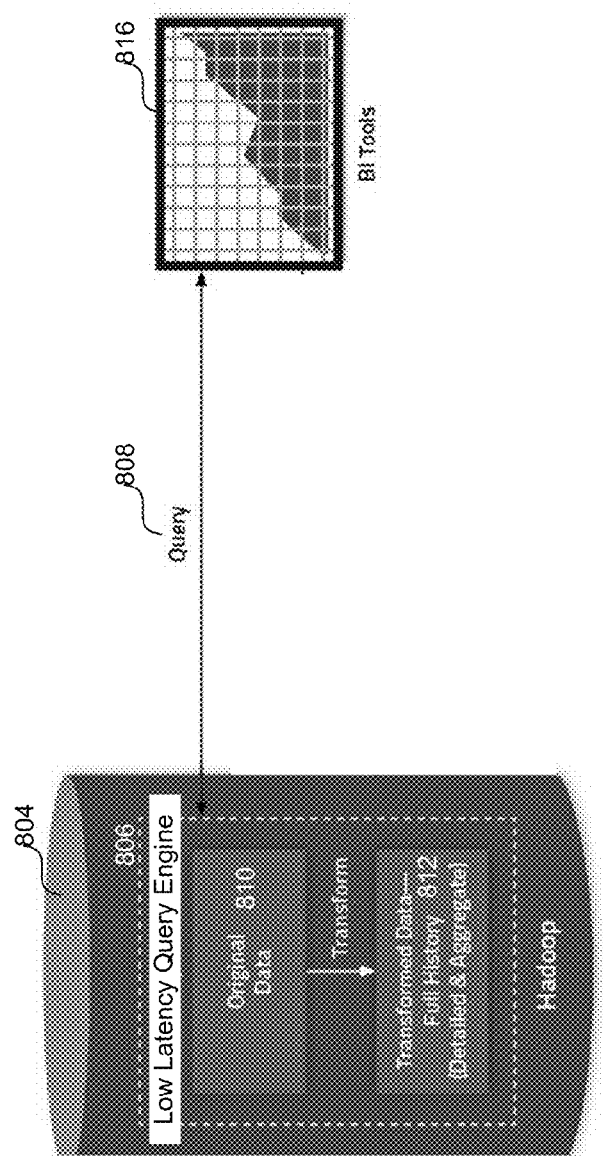
FIG. 8 depicts a block diagram illustrating a low latency query engine for real-time, ad hoc queries in a business intelligence environment.

FIG. 8 depicts a block diagram illustrating a low latency (LL) query engine for real-time, ad hoc queries in a business intelligence environment. As depicted, HADOOP™ 804 stores original data 806 in their native format. Unlike tradition relational databases where data fitting into a rigid schema is collected, the original data 810 does not adhere to any rigid schema and is in fact decoupled from the processing aspect. The low latency (LL) query engine 806 running on a data node in HADOOP™ can accept a query 808 from an application such as a business intelligence (BI) tool 816 via a client (e.g., ODBC/JDBC driver).

The query 808 can be made using a flexible schema-on-read model that can be defined, adapted and/or re-adapted to extract new value from the data 810 that would not be possible with rigid schemas. The low latency (LL) query engine 806 can read and parse relevant data once, perform a transformation, and store the transformed data 812 is an optimized in memory format to provide a fast response to the query 808.

Figure 9:
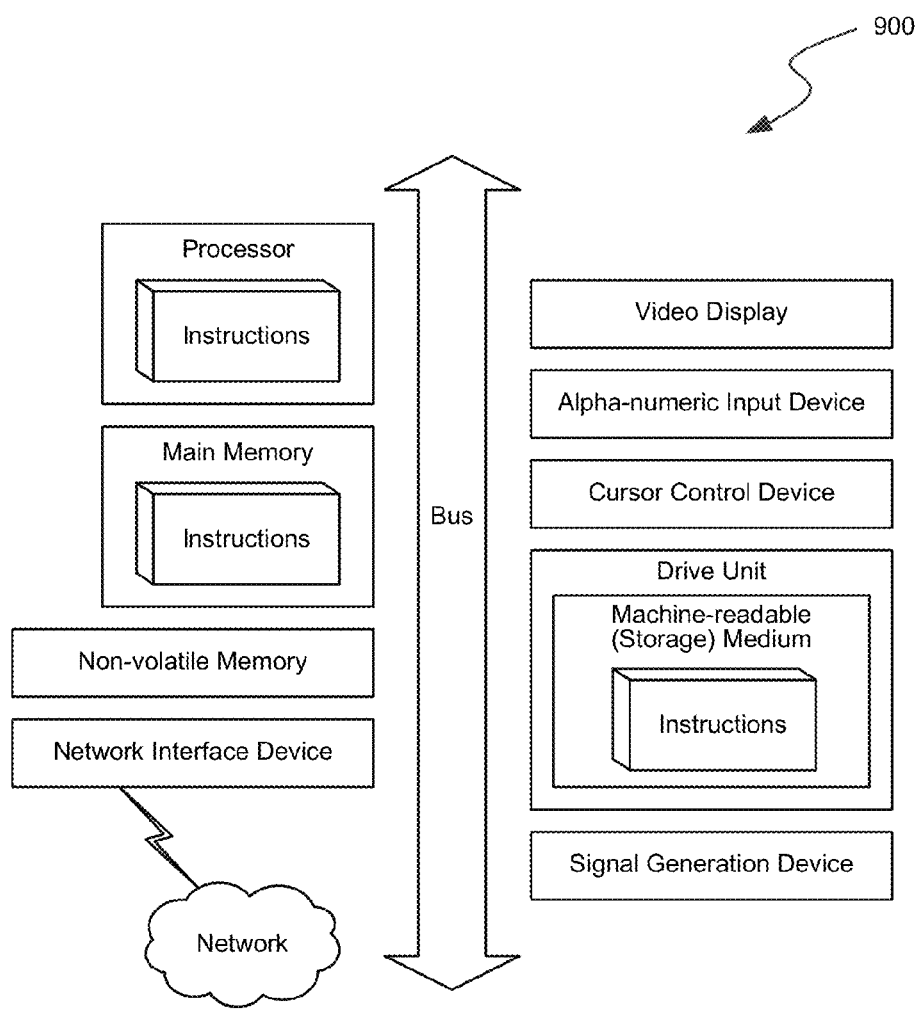
FIG. 9 depicts a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or MOTOROLA POWERPC™ microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as WINDOWS™ from Microsoft Corporation of Redmond, Wash., and their associated file management systems. Another example of operating system software with its associated file management system software is the LINUX™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶13, other aspects may likewise be embodied as a means-plus-function claim, or in other forms, such as being embodied in a computer-readable medium. (Any claims intended to be treated under 35 U.S.C. §112, ¶13 will begin with the words "means for".) Accordingly, the applicant reserves the right to add additional claims after filing the application to pursue such additional claim forms for other aspects of the disclosure.

What is claimed is:

1. A system for performing queries on stored data in a HADOOP™ distributed computing cluster having a plurality of data nodes, each data node being a computing device having processing circuitry and memory circuitry, the system comprising:
   a state store that tracks a status of each data node, wherein the state store is separate from the data nodes and is further coupled to a name node that tracks where file data are stored across the cluster; and
   a plurality of data nodes forming a peer-to-peer network for the queries, each data node functioning as a peer in the peer-to-peer network and being capable of interacting with components of the HADOOP™ cluster, each peer having an instance of a query engine running in memory, each instance of the query engine having:
      a query planner configured to:
         receive queries from clients;
         obtain, from the state store and the name node, (1) membership information regarding all query engine instances that are running in the cluster, and (2) location information regarding where data blocks relevant to the queries are distributed among the plurality of data nodes;
         parse queries from clients to create query fragments based on data obtained from the state store and the name node; and
         construct a query plan based on the data obtained from the state store;
      a query coordinator configured to distribute the query fragments among the plurality of data nodes according to the query plan; and
      a query execution engine configured to execute the query fragments, to obtain intermediate results from other data nodes that receive the query fragments, and to aggregate the intermediate results for the clients.

2. The system of claim 1, wherein the distributed computing cluster is configured to store unstructured data.

3. The system of claim 2, wherein a query coordinator and a query planner of one of the plurality of data nodes are selected as an initiating query coordinator and an initiating query planner, respectively, for a query from a client.

4. The system of claim 3, wherein the initiating query coordinator and the initiating query planner are selected by a routing component that uses a load balancing scheme to distribute queries from clients among the plurality of data nodes.

5. The system of claim 3, wherein the initiating query coordinator and the initiating query planner are selected based on the client targeting a specific data node from the plurality of data nodes to send the query.

6. The system of claim 3, wherein the query fragments are executed in parallel by query execution engines of data nodes from plurality of data nodes that have data relevant to the query.

7. The system of claim 6, wherein the initiating query coordinator aggregates query results from the query execution engines and provides the aggregated query results to the client.

8. The system of claim 7, wherein prior to sending the query results to the initiating query coordinator, intermediate query results are streamed between the query execution engines for pre-aggregation.

9. The system of claim 6, wherein the query execution engines execute the query fragments directly on APACHE HBASE™ data and HADOOP DISTRIBUTED FILE SYSTEM (HDFS™) data that comprise the stored data.

10. The system of claim 2, wherein
   the state store is further coupled to a metadata store that stores metadata relevant to a database management engine implemented in the cluster, and
   wherein the query planner is configured to:
      obtain, from the state store, metadata associated with the queries.

11. The system of claim 2, wherein the initiating query planner uses information from the name node in the cluster to identify data nodes that have relevant data for the query.

12. The system of claim 2, further comprising a low level virtual machine component for run-time code generation and latency reduction.

13. The system of claim 1, wherein the query execution engines determines a schema-on-read to translate the stored data into an in memory format at run time.

14. The system of claim 1, wherein the location information includes a plurality of replicas of the data blocks relevant to the queries, and
   wherein the query planner or the query coordinator is configured to select one or more, but not all, of the plurality of replicas for execution of the query fragments.

15. The system of claim 1, wherein, when the state store fails, the system is configured to continue to operate based on last information received from the state store.

16. The system of claim 1, wherein all instances of the query engine, at start up, register with the state store and obtain the membership information.

17. The system of claim 1, wherein the membership information is suitable for devising information about all the query engine instances that are running in the cluster.

18. The system of claim 1, wherein the state store caches metadata for running queries and distributes the metadata to query engine instances at start up and/or at a time when the metadata is updated.

19. The system of claim 1, wherein, when the state store fails, rest of the system continues to operate based on last information received from the state store.

20. The system of claim 1, wherein the name node includes details of distribution of files across the data nodes to optimize local reads.

21. The system of claim 1, wherein the name node includes information concerning disk volumes where files are located, on an individual data node.

22. The system of claim 1, wherein the query planner is further configured to use a select number of operators to construct the query plan, and wherein each operator can either generate data or combine data.

23. A method of executing a query in a HADOOP™ distributed computing cluster having multiple data nodes forming a peer-to-peer network for the query, each data node functioning as a peer in the peer-to-peer network and being capable of interacting with components of HADOOP™ cluster, each peer having an instance of a query engine running in memory, each instance of the query engine is configured to perform; the method comprising:
   receiving, by a one data node in the distributed computing cluster, a query;
   designating the one data node that receives the query as a coordinating data node;
   obtaining, by the coordinating data node and through a state store and a name node, (1) membership information regarding all query engine instances that are running in the cluster, and (2) location information regarding where data blocks relevant to the query are distributed among the plurality of data nodes, wherein the state store is separate from the data nodes;

parsing the query to create fragments of the query based on data obtained from the state store and the name node;

constructing a query plan based on the data obtained from the state store;

distributing, by the coordinating data node and according to the query plan, the fragments of the query to data nodes in the distributed computing cluster that have data relevant to the query;

receiving, from the data nodes having data relevant to the query, intermediate results corresponding to execution of the fragments of the query; and generating a final result based on the intermediate results for a client.

24. The method of claim 23, wherein the data nodes execute the fragments of the query on a distributed file system or a data store of the distributed computing cluster.

25. The method of claim 24, wherein the distributed computing cluster is an APACHE HADOOP™ cluster, the distributed file system is a HADOOP DISTRIBUTED FILE SYSTEM (HDFS™) and the data store is a "NoSQL" (No Structured Query Language) data store.

26. The method of claim 25, wherein the NoSQL data store include APACHE HBASE™.

27. The method of claim 25, further comprising:

parsing and analyzing the query to determine tasks to be performed by query execution engines running on the data nodes in the APACHE HADOOP™ cluster.

28. The method of claim 27, further comprising:

determining states of the data nodes from a state store, wherein the state store registers the data nodes at start up or after a loss of connection.

29. The method of claim 28, further comprising:

determining location of the data relevant to the query from the state store.

30. The method of claim 27, wherein the query execution engines implement a low level virtual machine for run-time code generation to reduce latency.

31. The method of claim 25, wherein during execution of the fragments of the query in parallel across the data nodes, intermediate results from the execution are streamed between query execution engines running on the data nodes.

32. The method of claim 25, further comprising:

receiving, by the coordinating data node, pre-aggregated results of the query from the data nodes; and performing, by the coordinating data node, an operation on the pre-aggregated results to determine results of the query.

33. The method of claim 32, wherein the operation includes an aggregation operation or an TopN operation.

34. The method of claim 25, wherein the fragments of the query correspond to plans that include partitions along scan boundaries.

35. The method of claim 25, wherein the data node includes the coordinating data node.

36. The method of claim 23, further comprising:

sending, by the coordinating data node, the results to the client.

37. The method of claim 23, further comprising:

obtaining, from the state store, metadata associated with the query.

38. The method of claim 23, wherein the location information includes a plurality of replicas of the data blocks relevant to the queries, and the method further comprising:

selecting one or more, but not all, of the plurality of replicas for execution of the fragments of the query.

39. The method of claim 23, further comprising:

upon determining that the state store has failed, continuing to operate based on last information received from the state store.

* * * * *